United States Patent [19]

Thayer

[11] 4,122,958

[45] Oct. 31, 1978

[54] PIANO HAND TRUCK

[76] Inventor: Orla E. Thayer, P.O. Box 473, Waldport, Oreg. 97394

[21] Appl. No.: 817,369

[22] Filed: Jul. 20, 1977

[51] Int. Cl.[2] .................................................. B60P 1/34

[52] U.S. Cl. .............................. 214/38 CC; 214/1 D; 214/77 R; 254/3 R

[58] Field of Search ..................... 214/1 D, 77 R, 501, 214/502, 512, 38 R, 38 C, 38 CC, 75 R, 700, 701 R, 701 P, 146.5, 148; 254/3 R, 3 C; 280/43.24

[56] References Cited

U.S. PATENT DOCUMENTS

| | | | |
|---|---|---|---|
| 395,371 | 1/1889 | Weser | 254/3 R |
| 1,584,250 | 5/1926 | Stephenson et al | 254/3 R |
| 1,887,134 | 11/1932 | Johancen et al | 254/3 R X |
| 2,176,551 | 10/1939 | Solem | 280/43.24 X |
| 3,191,786 | 6/1965 | Langrell | 214/1 D X |

*Primary Examiner*—Robert G. Sheridan
*Attorney, Agent, or Firm*—Klarquist, Sparkman, Campbell, Leigh, Hall & Whinston

[57] ABSTRACT

A grand piano hand truck comprising an elongated piano-receiving frame pivotally supportable on an A-frame jacking carriage is disclosed. A transport base positioned adjacent the carriage receives the piano and elongated frame so that the piano is supported on its side during transit.

23 Claims, 9 Drawing Figures

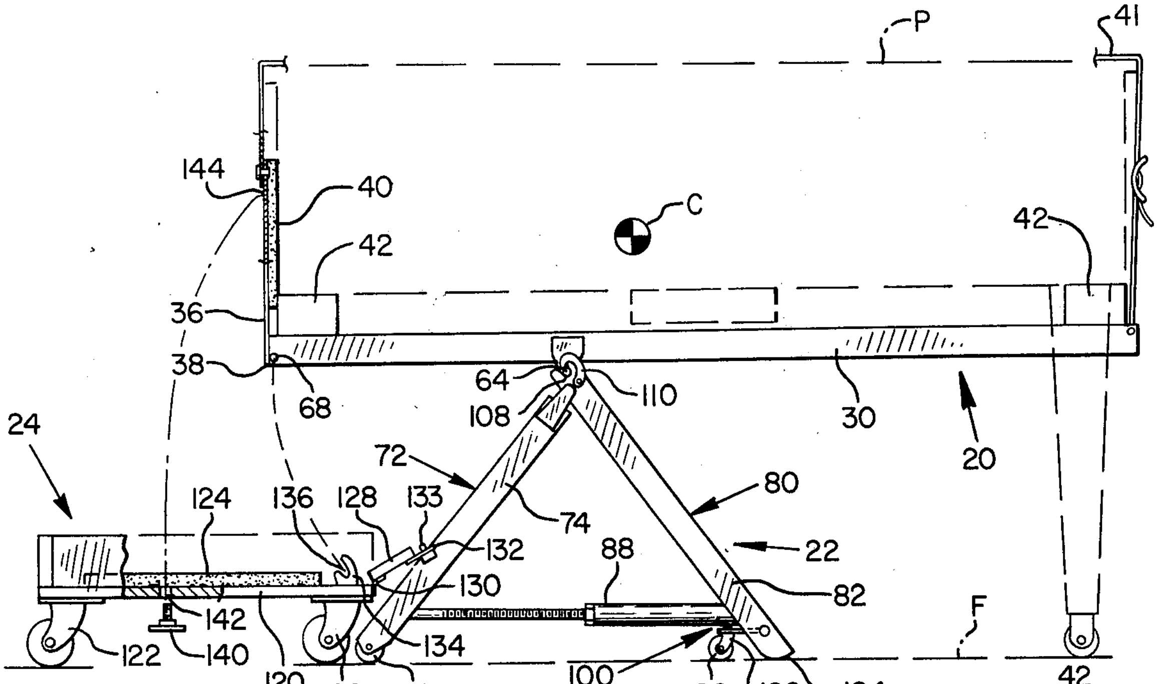
FIG. 1
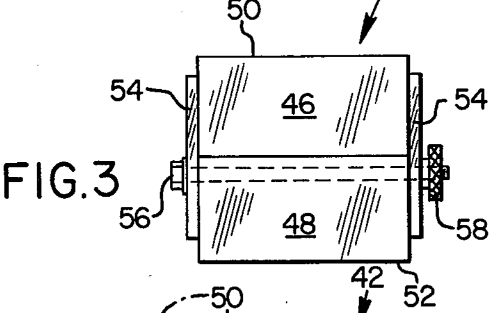
FIG. 3
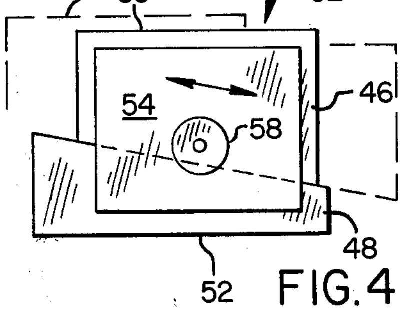
FIG. 4
FIG. 2
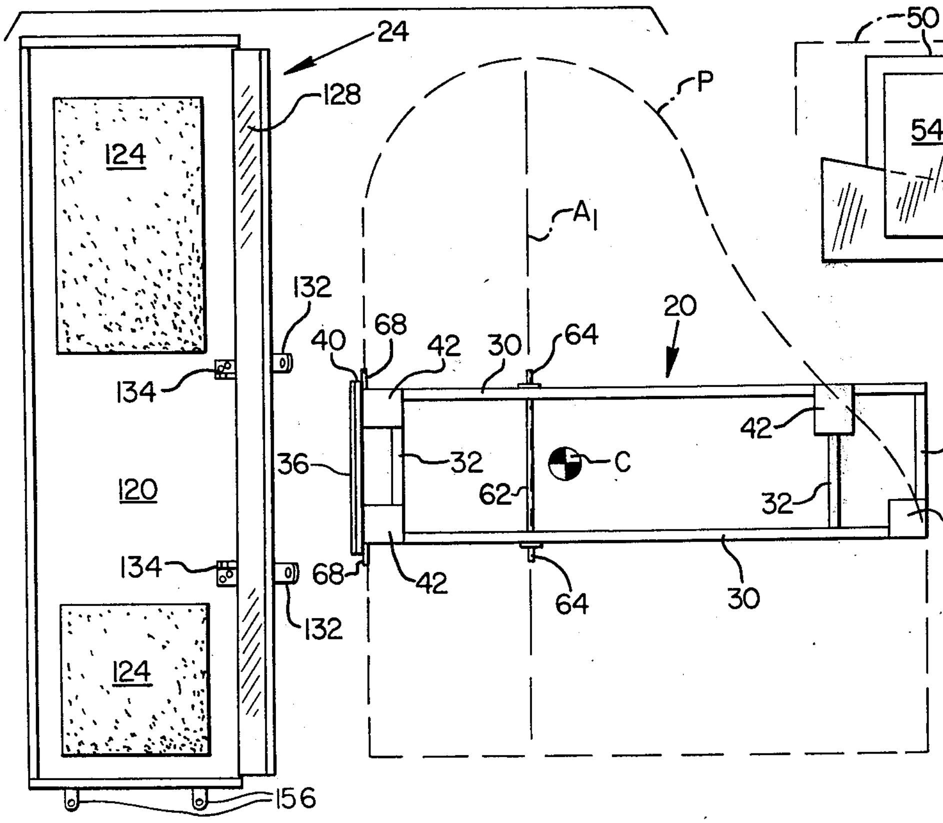

PIANO HAND TRUCK

BACKGROUND OF THE INVENTION

The present invention relates to hand trucks for tilting and moving table-like objects which are supported by detachable or retractable legs. More specifically, the invention relates to hand trucks for moving grand pianos.

The moving of a large, heavy, fragile objects has long been recognized as a difficult task. For example, most grand pianos are equipped with legs which are relatively weak considering the amount of weight which they support. These legs are easily broken so it is common practice to lift a grand piano off its legs and onto a dolley whenever the piano is moved even a short distance. When moving a grand piano past obstructions or through door openings, it is usually necessary to set the instrument on its side and remove its legs. This activity has traditionally required the labor of two or more workers and a substantial amount of time.

SUMMARY OF THE INVENTION

The present invention is a hand truck which may be used to move grand pianos or similarly shaped objects. The truck comprises an elongated support frame which conforms to the underside of a grand piano bed and an A-frame jacking carriage pivotally supporting said carriage and operable to lift said carriage and a piano supported thereon off of the ground. Also provided is a transport base onto which the piano may be tilted. The base is supported by casters so that the piano may conveniently be moved from place to place while resting thereon.

It is a primary object of this invention to provide a device which will enable one worker of ordinary strength to lift a grand piano or similarly shaped article off the ground and tilt it onto its side for transport.

A further object is to provide such a device which is simple, lightweight and has a minimum of moving parts.

Other objects and features of the invention will be apparent from the attached drawings and specification.

BRIEF DESCRIPTION OF THE DRAWINGS

In the drawings:

FIG. 1 is a side elevation showing the elongated frame, transport base and jacking mechanism of a first embodiment of a piano truck according to the present invention;

FIG. 2 is a top view of the elongated frame and transport base of the truck of FIG. 1;

FIG. 3 is an end view of a support block mounted on the elongated frame of FIG. 2;

FIG. 4 is a side view of the block of FIG. 3;

DESCRIPTION OF THE PREFERRED EMBODIMENT

Figure 5:
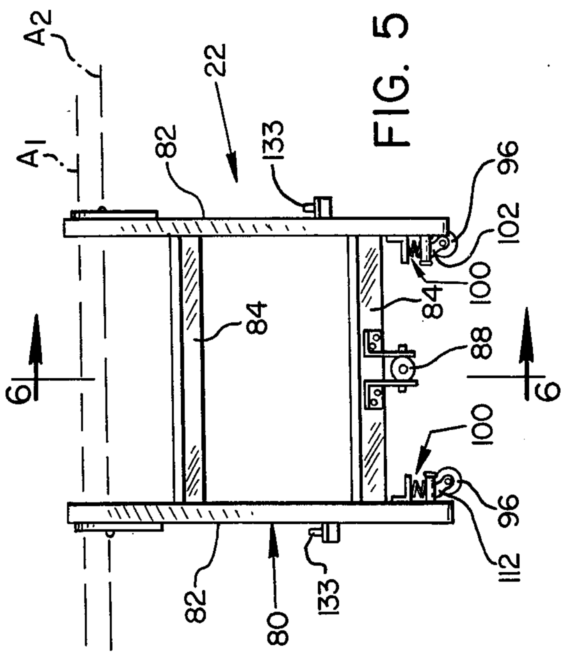
FIG. 5 is an end view of the jacking mechanism of the truck of FIG. 1.

As shown in FIG. 1, the piano truck of the present invention includes three major components, an elongated support frame 20, an A-frame jacking carriage 22 and a transport base or dolley 24.

Referring specifically to FIGS. 1 and 2 the support frame 20 includes a pair of longitudinal rails 30 and a plurality of lateral cross brace rails 32.

Perpendicular to the longitudinal rails 30 at one end of the frame 20 is mounted a foot plate 36 which meets the elongated frame to form a corner at 38. The side of the foot plate which faces the inside of the corner is covered with cushioning material 40 to protect the case of a grand piano P, shown in dash lines in FIGS. 1 and 2, which is to be moved. Web straps 41 are provided to secure the piano P to the frame 20.

Mounted on the elongated frame are a plurality of spacer or support blocks 42 which may be adjusted in height to conform the upper surface of the frame 20 to the underside of the piano P. These blocks, which FIGS. 3 and 4 show in greater detail, include upper and lower wedges 46 and 48. The wedges slide in relation to each other so that an upper surface 50 of the upper wedge 46 raises or lowers, but is always parallel to the upper surface of the elongated frame 20. The lower wedge 48 is permanently affixed to the elongated frame at 52. Plates 54 are provided at each side of the block assembly and are held in contact with the wedges by means of a bolt 56 which extends through both plates and the upper wedge 46. A free, threaded end of the bolt receives a knurled nut 58 which can be finger tightened so that the plates 54 clamp the wedges 46, 48 together in a vise-like manner. The upper surface 50 may thus be locked at a fixed height above the elongated frame 20.

Referring again to FIGS. 1 and 2, a pivot rod 62 is mounted on the elongated frame perpendicular to a vertical plane through the longitudinal axis of the frame. The ends of the pivot rod 62 extend beyond the longitudinal rails 30 to form pivot pins 64 for mounting the elongated frame 20 to the jacking carriage 22. When so mounted, the rod 62 serves as a horizontal pivot axis $A_1$ about which the frame 20 can rotate. The rod 62 is located sufficiently near to the foot plate 36 that, when a piano is supported on the elongated frame 20 with the flat portion of the piano's outer rim resting against the cushioning material 40, the pivot rod 62 is located between and parallel to a first vertical plane extending through the foot plate and the second vertical plane extending through the piano's center of gravity indicated at C. The illustrated pivot rod 62 is permanently attached to the elongated frame 20 because all grand pianos have centers of gravity which are similarly located. If the truck is to be used for moving objects other than pianos, it can be provided with a pivot rod which is positionable at a variety of locations along the frame 20.

Also mounted on the frame 20 are a pair of heel pins 68 which extend outwardly from the corner 38. The heel pins 68 extend parallel to the pivot pins 64 and as described below are used for joining the elongated frame 20 to the transport base 24.

Figure 6:
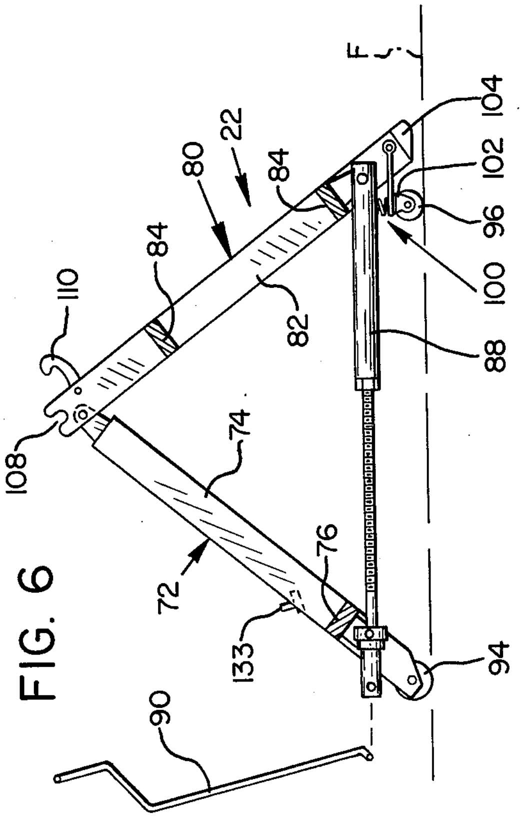
FIG. 6 is a cross-sectional view taken along line 6—6 of FIG. 5.

Referring to FIGS. 1, 5 and 6, the jacking carriage 22 has an inner jacking frame 72 including side rails 74 and a cross rail 76 and also an outer jacking frame 80 including side rails 82 and cross rails 84. The jacking frames 72 and 80 are hinged to each other about a common jacking axis $A_2$ and extend generally downwardly and outwardly in opposite directions from that axis. The lower ends of the jacking frames are connected by a screw jack mechanism 88 which is manually driven by a crank 90. This mechanism regulates the distance between the lower ends of the frames and thus can be used to vary the elevation of the upper ends of the frames.

The lower ends of the jacking frames 72 and 80 are equipped with rollers 94 and 96 so that the frames' lower ends can be moved toward and away from each other along a floor surface F and also the jacking carriage can similarly be moved. The rollers 94 are of conventional design but the rollers 96 are swiveling rollers mounted to the outer jacking frame 80 by means of a spring mechanism 100. The springs are positioned to exert a downward force on the rollers' yokes 102 sufficient to hold the lower ends 104 of rails 82 above surface F when the jacking carriage is carrying only the weight of the elongated frame 20. If a heavier load, such as a piano, is placed on the jacking carriage 22, the springs compress so that the rollers 96 retract and the lower ends 104 come into contact with the floor surface F to laterally stabilize the carriage 22.

At the upper ends of the carriage's side rails 82 are upwardly opening notches 108 which receive the pivot pins 64 of the elongated frame 20. The notches 108 are located so that the horizontal pivot axis $A_1$ lies adjacent and parallel to the jacking axis $A_2$ when the frame 20 is mounted on the carriage 22. Pivot pin hooks 110 are provided to maintain the pivot pins 64 in notches 108.

Figure 7:
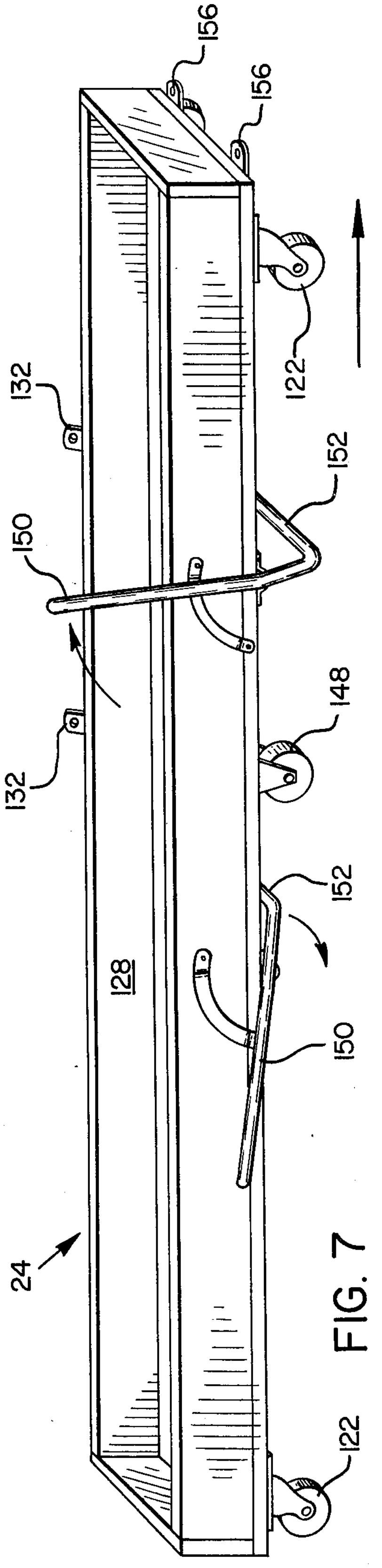
FIG. 7 is an oblique view of the transport base of the truck of FIG. 1.

A preferred transport base 24 which receives the elongated frame 20 from the jacking carriage 22 is shown in FIGS. 1, 2 and 7 as an elongated box which is open at the top. The floor or bed 120 of the box is supported by swivel casters 122 at its corners. Areas of the floor 120 are covered with a layer of padding material 124 which receives and cushions the foot plate 36 of elongated frame 20. One of the base's elongated side rails 128 is hinged at 130 and has two outwardly extending pad eyes 132 which are spaced to mate with two pins 133 on the inner jacking frame 72. Mounted on the floor 120 of the transport base are two brackets 134 which define upwardly opening, heel pin-receiving notches 136 positioned to receive the heel pins 68. The brackets 134 thus serve as a heel brace for the corner 38 of the elongated frame 20.

The transport base includes two knurled hand bolts 140 which may be inserted through oversize floor openings 142 and screwed into internally threaded openings in the foot plate 36 to secure the foot plate against the floor. Two intermediate rollers 148 beneath the floor 120 of the transport base are not normally in contact with the floor surface F, but prevent the transport base from "high centering" as it is moved over an uneven surface. The base 24 also has a pair of brake levers 150. By appropriately positioning the levers, floor-engaging portion 152 thereof contact the floor surface F to stabilize the transport base and prevent it from moving. Additional pad eyes 156 are provided at one end of transport base 24 for connecting the transport base to a winching cable or other mechanical moving device.

OPERATION

To move a grand piano using the above described piano hand truck it is first necessary to close and secure the piano casing keyboard cover and blanket the finished surfaces of the piano case with a padded cover. The piano's pedal mechanism is then removed and set aside.

Using the crank 90 the screw jack 88 should be extended to its full length so that the jacking carriage 22 is reduced to its minimum heighth. The elongated frame 20 is then placed on the jacking carriage 22 with its pivot pins 64 resting in the notches 104, as shown in FIG. 1, and the hooks 110 positioned to retain the pivot pins 64 in the notches 104. While holding the elongated frame 20 in a horizontal position, the combined frame and carriage assembly is rolled under the piano and located, as is shown in FIGS. 1 and 2, with the cushioning material 40 positioned snugly against the left side rim of the piano case as near to the front legs as possible.

By reducing the extension of the screw jack 84, the frame 20 is then raised until the spacer blocks 42 just contact the bottom of the piano bed. Next the blocks are adjusted so that the piano will be evenly supported on all four blocks and the crank 90 used to slowly further reduce the extension of screw jack 88 and thus raise the piano until the two piano legs nearest the inner jacking frame leave the floor surface F. These two legs will be the first to raise since the piano's center of gravity C is located farther from the foot plate than is the pivot axis through pivot pins 64.

At this point the web straps 41 are cinch tightened to snugly secure the piano to the frame 20; and the two elevated legs removed and set aside. Now the screw jack 88 is again fully extended so that the jacking frame is returned to its lowest possible elevation. The transport base is moved into position adjacent the inner jacking frame 72 and secured to that frame by tipping the hinged side rail 128 so that the pad eyes 132 are retained on the pins 133 as shown in FIG. 1. Preferably, the brakes 150 are set with portions 152 engaging the floor surface to stabilize the transport base 24.

Next, the hooks 110 are disengaged and the piano slowly tilted (counterclockwise in FIG. 1) about the pivot axis $A_1$ until the heel pins 68 are received by the notches 136. Thereafter the piano is further rotated about an axis through the heel pins 68 so that the pivot pins 64 leave notches 108 and eventually the foot plate 36 comes to rest against the padding material 124. The foot plate 36 may then be secured to the floor 120 by the knurled hand bolts 140 and the hinged side rail 128 returned to an upright position and secured. When the remaining piano leg is removed and the brakes released, the transport base 24 with the piano positioned thereon can be moved to any desired location. Once the piano is delivered to the desired location, it is reassembled by following the aforesaid steps in reverse order.

Figure 8:
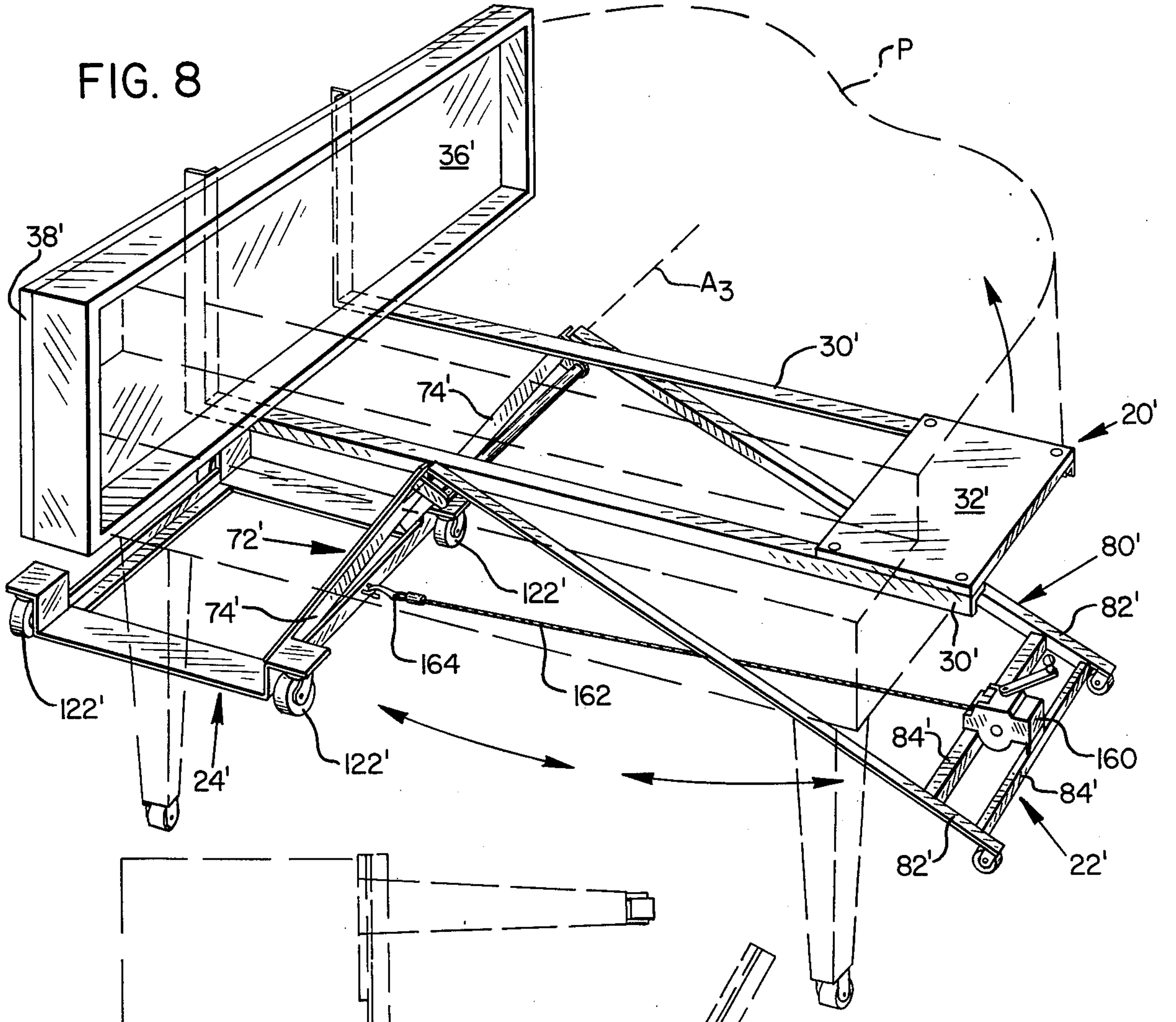
FIG. 8 is an oblique view of a second embodiment of a piano truck according to the present invention.
Figure 9:
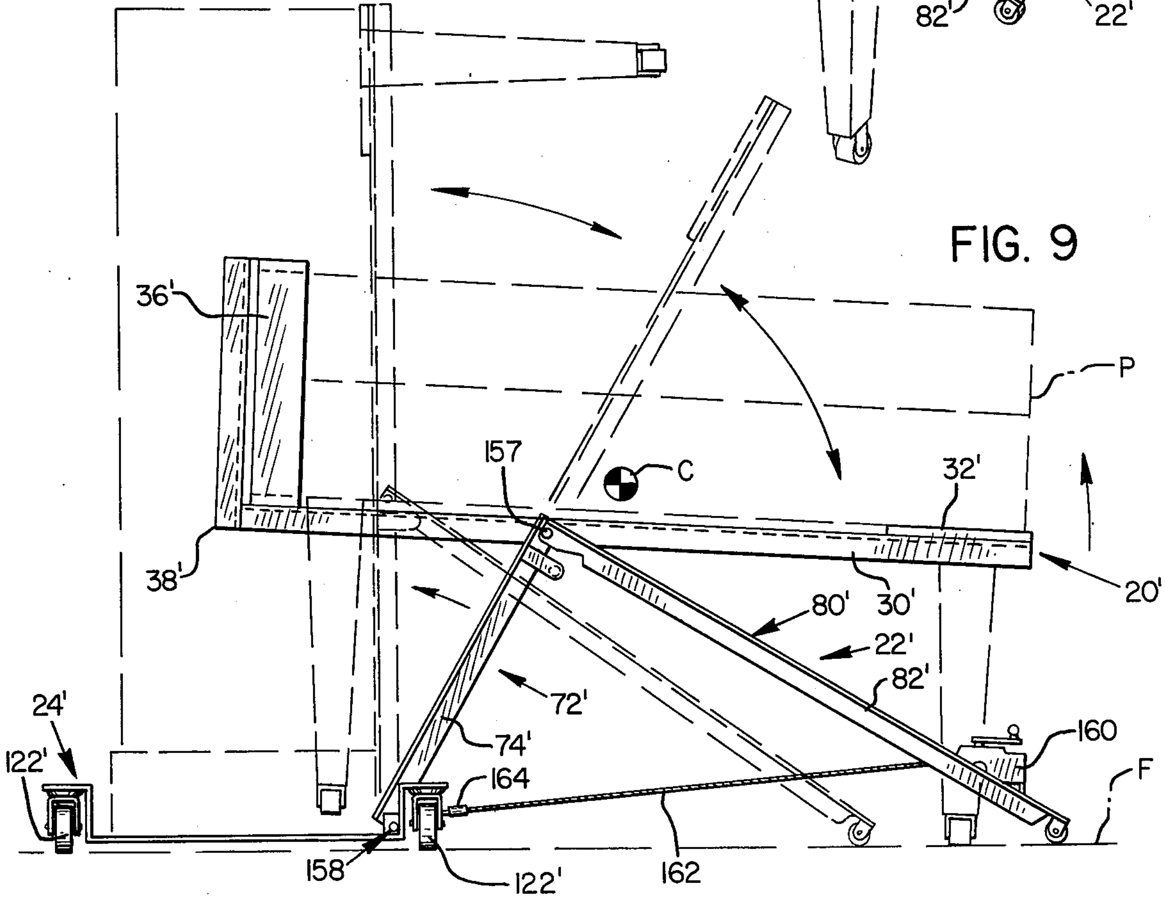
FIG. 9 is a side view of the truck shown in FIG. 8.

FIGS. 8 and 9 show a second embodiment of the present invention which is similar to the embodiments shown in FIGS. 1 thru 7. The most notable difference is that the second embodiment has an elongated support frame 20', a jacking carriage 22' and a transport base 24' which are permanently secured together as an integral unit.

Specifically, the jacking frames 72' and 80' and the elongated frame 20' are retained on and pivot about a single pair of pins 157. Also, the lower end of the inner jacking frame 72' is permanently hinged at 158 to the transport base 24'. The screw jack of the first embodiment is replaced by a winch 160 on the outer jacking frame 80' and a cable 162 which connects by means of a hook 164 to the transport base 24'.

The operation of the second embodiment is identical to that previously described except that none of its major components are ever separated. For example, the jacking carriage 22' does not become detached from the elongated frame 20' when the piano body is rotated into a vertical position. Instead, the inner jacking frame 72' is carried by the elongated frame 20' into the vertical position as shown by dotted lines in FIG. 9. When this occurs the cable 162 becomes slack and may be unhooked from the transport base 24'. After the cable is unhooked, the outer jacking frame 82' is rotated (counterclockwise in FIG. 9) about the pins 156 until it extends vertically upward. Prior to moving of the piano, the outer jacking frame 80' is secured to the elongated frame 20' and the cable 162 wound completely onto the winch 160 or otherwise stowed. Thus when the second embodiment is used, the entire hand truck assembly travels with the piano.

While I have shown and described preferred embodiments of my invention, it will be apparent to those skilled in the art that changes may be made without departing from my invention in its broader aspects and that my invention can be used to move other heavy objects, such as pool tables, which are supported by detachable or retractable legs.

I claim:

1. A hand truck for transporting a freestanding article having an elevated undersurface comprising:
   - an elongated frame having a foot plate on one end thereof for supporting an article adapted to be placed on said frame;
   - jacking means attachable to said frame for lifting thereof and for free pivotal movement of said frame with respect to all portions of said jacking means about a horizontal pivot axis; and
   - a generally horizontal transport base supported by casters and adapted to receive and cradle said foot plate.

2. The truck of claim 1 wherein:
   - said pivot axis is located perpendicular to a vertical plane through the longitudinal axis of said frame; and
   - said jacking means is attachable to said frame at a point near enough to said foot plate such that when an article is placed on said frame, said pivot axis is located between and parallel to a first vertical plane extending through said foot plate and a second vertical plane extending through said articles's center of gravity.

3. The truck of claim 1 wherein:
   - said jacking means includes inner and outer jacking frames angularly disposed to each other and hinged about a common jacking axis located adjacent and parallel to said pivot axis;
   - said frames extending generally downwardly and outwardly in opposite directions from said jacking axis;
   - said frames having free lower ends interconnected by distance regulating means and supported by rollers.

4. The truck of claim 3 wherein said distance regulating means comprises:
   - a screw jack; and
   - means for driving said jack.

5. The truck of claim 3 wherein said distance regulating means comprises:
   - a winch mounted on one of said jacking frames for winding of a cable; and
   - a cable connectable at one end to said winch and connectable at its other end to the other of said jacking frames.

6. The truck of claim 3 further comprises pressure-sensitive mounting means for retractably mounting said rollers supporting said outer jacking frame;
   - said mounting means being adapted to retract said rollers when said elongated frame is attached to said jacking means and is supporting the added weight of an article.

7. The truck of claim 3 wherein said pivot axis and said jacking axis lie in a single line.

8. The truck of claim 3 wherein:
   - said elongated frame further comprises a pivot pin axially aligned with said pivot axis; and
   - one of said jacking frames, at its upper end, defines an upwardly opening notch to receive said pivot pin.

9. The truck of claim 1 wherein said transport base is attachable at one of its longitudinal edges to said jacking means.

10. The truck of claim 9 wherein said transport base is permanently attached to said jacking means.

11. The truck according to claim 9 wherein said transport base is adapted to receive a corner formed between said elongated frame and said foot plate, and to allow pivotal movement of said elongated frame about said corner when:
    - said transport base is attached to said jacking means;
    - said elongated frame is attached to said jacking means with said one end of said elongated frame extending toward said transport base; and
    - said elongated frame is pivoted to a position wherein said corner is in contact with said transport base.

12. A hand truck for transporting articles having an elevated undersurface comprising:
    - an elongated frame having a foot plate on one end thereof for supporting an article adapted to be placed on said frame, said foot plate joining said frame to form a corner, and a heel pin positioned parallel and adjacent to said corner;
    - jacking means attachable to said frame for lifting thereof and for pivotal movement of said frame with respect to jacking means about a horizontal pivot axis; and
    - a generally horizontal transport base supported by casters, attachable at one of its longitudinal edges to said jacking means and adapted to receive and cradle said foot plate, said transport base including, near said one of its longitudinal edges, a bracket defining an upwardly opening notch to receive said heel pin and to allow pivotal movement of said elongated frame about said corner when:
    - said transport base is attached to said jacking means,
    - said elongated frame is attached to said jacking means with said one end of said elongated frame extending toward said transport base, and
    - said elongated frame is pivoted to a position wherein said heel pin is received by said notch.

13. The truck of claim 1 further comprising article retaining means adapted to extend between opposite ends of said elongated frame for securing an article between said frame and said retaining means.

14. The truck of claim 1 further comprising means for securing said foot plate to said transport base.

15. The truck of claim 1 further comprising article supporting blocks attached to an upper surface of said elongated frame, said blocks including height adjustment means so that the height of said blocks may be adjusted to conform to the under surface of an article to be carried by said truck.

16. The truck of claim 1 further comprising brake means mounted on said transport base, said brake means being manually operable to prevent undesired motion of said base.

17. The truck of claim 1 wherein said elongated frame is permanently attached to said jacking means.

18. A hand truck for transporting a freestanding grand piano comprising:
- an elongated frame having a foot plate on one end thereof for supporting a flat portion of a grand piano case's outer rim and a horizontal pivot axis perpendicular to a vertical plane through the longitudinal axis of said frame at a point near enough to said foot plate such that when such a portion of a grand piano rim is positioned against said foot plate, said pivot axis is located between and parallel to a first vertical plane extending through said foot plate and a second vertical plane extending through the piano's center of gravity;
- jacking means including inner and outer jacking frames angularly disposed to each other and hinged about a common jacking axis located adjacent and parallel to said pivot axis, said jacking frames extending generally downwardly and outwardly in opposite directions from said jacking axis, said jacking frames having free lower ends interconnected by distance regulating means and supported by rollers, one of said jacing frames having an upper portion pivotally attachable to said frame at said pivot axis so that said frame can pivot freely with respect to both said jacking frames and so that activation of said distance regultaing means will cause said frame to move vertically; and
- an elongated, generally horizontal transport base supported independently of said jacking means by casters, attachable at one of its longitudinal edges to said inner jacking frame, and adapted to receive and cradle said foot plate so that during transit, said article rests on said foot plate and said foot plate is supported by said transport base.

19. The truck of claim 18 further comprising:
- pressure sensitive mounting means for retractably mounting said rollers supporting said outer jacking frame, said mounting means being adapted to retract said rollers when said elongated frame is attached to said jacking means and is supporting the added weight of a piano;
- piano retaining means adapted to extend between opposite ends of said elongated frame for securing a piano between said frame and said retaining means;
- means for securing said foot plate to said transport base;
- piano supporting blocks attached to an upper surface of said elongated frame, said blocks including height adjustment means so that the height of said blocks may be adjusted to conform to the underside of a piano; and
- brake means mounted on said transport base, said brake means being manually operable to prevent undesired motion of said transport base;
- said distance regulating means comprising a screw jack and means for driving said jack;
- said elongated frame further comprising a pivot pin axially aligned with said pivot axis;
- one of said jacking frames, at its upper end, defining an upwardly opening pivot pin-receiving notch;
- said elongated frame further comprising a heel pin positioned parallel to said pivot pin and located at a corner formed between said elongated frame and said foot plate;
- said transport base including, near said one of its longitudinal edges, a bracket defining an upwardly-opening heel pin-receiving notch so that said elongated frame can rotate about said heel pin when:

said transport base is attached to said jacking means, said pivot pin is positioned in said pivot pin-received notch with said one end of said elongated frame extending toward said transport base, and said elongated frame is pivoted to a position wherein said heel pin is received by said heel pin notch.

20. A hand truck for transporting freestanding articles having an elevated underside supported by removable legs or retractable legs comprising:
- an elongated frame adapted to receive and support the underside of such an article; and
- jacking means attachable to said frame for lifting thereof;
- said jacking means including inner and outer jacking frames angularly disposed to each other and hinged about a common jacking axis adjacent and parallel to said pivot axis, said frames extending generally downwardly and outwardly in opposite directions from said jacking axis, said frames having free lower ends interconnected by distance regulating means and supported by rollers;
- said elongated frame being free for manual, pivotal movement, independent of both said jacking frames, around a horizontal pivot axis located at the position where said elongated frame and jacking means attach.

21. The truck of claim 20 wherein:
- said elongated frame includes a foot plate at one end thereof;
- said pivot axis is located perpendicular to a vertical plane through the longitudinal axis of said frame; and
- said jacking means is attachable to said elongated frame at a point near enough to said foot plate such that when the underside of an article is supported by said frame, said pivot axis is located between and parallel to a first vertical plane extending through said foot plate and a second vertical plane extending through said article's center of gravity.

22. A hand truck for transporting a freestanding article having an elevated undersurface comprising:
- an elongated frame having a foot plate on one end thereof for supporting an article adapted to be placed on said frame;
- jacking means attachable to said frame for lifting thereof and for pivotal movement of said frame with respect to said jacking means about a horizontal pivot axis; and
- a generally horizontal transport base supported independently of said jacking means by casters and adapted to receive and cradle said foot plate so that during transit said article rests on said foot plate and said foot plate is supported by said transport base.

23. The truck of claim 1 wherein:
- a corner is formed along a line where said foot plate joins said elongated frame; and
- said transport base includes heel brace means for detachably receiving and supporting said corner for pivotal movement thereabout so that, after said elongated frame has been rotated about said pivot axis to the point where said corner is received by said heel brace means, further rotation in the same direction causes said elongated frame to rotate about said corner and causes the combined weight of said article and said frame to shift from said jacking means to said transport base.

* * * * *